(12) United States Patent
Kieper

(10) Patent No.: US 9,261,215 B2
(45) Date of Patent: Feb. 16, 2016

(54) COUPLING

(71) Applicant: NIBCO Inc., Elkhart, IN (US)

(72) Inventor: Douglas A. Kieper, Sellersburg, IN (US)

(73) Assignee: NIBCO Inc., Elkhart, IN (US)

( * ) Notice: Subject to any disclaimer, the term of this patent is extended or adjusted under 35 U.S.C. 154(b) by 105 days.

(21) Appl. No.: 13/865,402

(22) Filed: Apr. 18, 2013

(65) Prior Publication Data

US 2013/0277964 A1 Oct. 24, 2013

Related U.S. Application Data

(60) Provisional application No. 61/636,895, filed on Apr. 23, 2012.

(51) Int. Cl.
*F16L 19/03* (2006.01)
*F16L 47/04* (2006.01)
*F16L 19/02* (2006.01)
*F16L 19/025* (2006.01)

(52) U.S. Cl.
CPC ............... *F16L 47/04* (2013.01); *F16L 19/025* (2013.01); *F16L 19/0218* (2013.01)

(58) Field of Classification Search
USPC .......................................... 285/354, 423, 247
See application file for complete search history.

(56) References Cited

U.S. PATENT DOCUMENTS

| | | | |
|---|---|---|---|
| 1,968,563 A * | 7/1934 | Lofgren ........................ | 285/354 |
| 2,208,353 A * | 7/1940 | Woolley et al. ............... | 285/354 |
| 2,726,101 A | 12/1955 | Peterson | |
| 2,780,483 A * | 2/1957 | Kessler ........................ | 285/354 |
| 3,288,494 A * | 11/1966 | Callahan, Jr. et al. ........ | 285/354 |
| 3,633,944 A * | 1/1972 | Hamburg ....................... | 285/354 |
| 3,712,583 A * | 1/1973 | Martindale et al. ........... | 285/354 |
| 3,915,478 A * | 10/1975 | Al et al. ....................... | 285/354 |
| 3,931,992 A * | 1/1976 | Coel ............................. | 285/354 |
| 4,023,773 A * | 5/1977 | Wise ............................ | 251/148 |
| 4,093,280 A * | 6/1978 | Yoshizawa et al. ........... | 285/423 |
| 4,179,142 A * | 12/1979 | Schopp ........................ | 285/423 |
| 4,296,950 A | 10/1981 | Chamberlin | |
| 4,458,878 A * | 7/1984 | Tsuno ........................... | 285/354 |

(Continued)

FOREIGN PATENT DOCUMENTS

| | | |
|---|---|---|
| DE | 7409347 | 3/1974 |
| EP | 0 123 195 | 10/1984 |

(Continued)

OTHER PUBLICATIONS

PCT Search Report & Written Opinion for PCT/US2013/037691 dated Jul. 29, 2013.

*Primary Examiner* — David E Bochna
(74) *Attorney, Agent, or Firm* — Price Heneveld LLP

(57) ABSTRACT

A plumbing fitting for coupling a water supply line to a second plumbing fitting includes a polymeric tailpiece having one end for coupling to a conduit and an opposite end with an outwardly extending annular flange having an annular face surface. A circular recess is formed in the face surface for receiving a seal. A nut is positioned over the tailpiece and has an inwardly extending annular rim engaging a side of the flange opposite the face surface. The nut is formed of a polymeric material having internal threads and integrally includes a metal insert extending in concentric spaced relationship to the threads of the nut. The insert includes an end which is threaded and forms a lead-in thread that is coaxial with the threads of the nut.

14 Claims, 3 Drawing Sheets

(56) References Cited

U.S. PATENT DOCUMENTS

| | | | |
|---|---|---|---|
| 4,484,770 A * | 11/1984 | Sloane | 285/354 |
| 4,605,248 A * | 8/1986 | Goldsmith et al. | 285/354 |
| 4,682,797 A | 7/1987 | Hildner | |
| 4,788,022 A | 11/1988 | Sakayori et al. | |
| 4,905,766 A | 3/1990 | Dietz et al. | |
| 5,033,435 A * | 7/1991 | Ostarello et al. | 285/354 |
| 5,052,721 A * | 10/1991 | Gorman, Jr. | 285/354 |
| 5,105,929 A | 4/1992 | Schmid et al. | |
| 5,154,453 A * | 10/1992 | Nishio | 285/354 |
| 5,366,257 A | 11/1994 | McPherson et al. | |
| 5,437,481 A | 8/1995 | Spears et al. | |
| 5,645,301 A * | 7/1997 | Kingsford et al. | 285/354 |
| 5,775,743 A * | 7/1998 | Rochelle | 285/354 |
| 6,186,558 B1 | 2/2001 | Komolrochanaporn | |
| 6,361,083 B1 | 3/2002 | Riesselmann et al. | |
| 6,540,261 B1 | 4/2003 | Painter et al. | |
| 6,543,815 B2 * | 4/2003 | Suzuki | 285/354 |
| 6,702,336 B1 | 3/2004 | Chelchowski et al. | |
| 6,991,268 B2 * | 1/2006 | Spears | 285/392 |
| 7,017,951 B2 * | 3/2006 | Spears | 285/423 |
| RE39,584 E * | 4/2007 | Nishio | 285/423 |
| 7,270,351 B2 | 9/2007 | Chelchowski et al. | |
| 7,350,832 B1 * | 4/2008 | Kiely | 285/354 |
| 7,426,784 B2 | 9/2008 | Spears et al. | |
| 7,597,363 B2 | 10/2009 | Hikmat et al. | |
| 7,810,851 B2 * | 10/2010 | Wangsgaard | 285/354 |
| 8,534,716 B2 * | 9/2013 | Cowell et al. | 285/354 |
| 2010/0201124 A1 | 8/2010 | Duquette et al. | |

FOREIGN PATENT DOCUMENTS

| | | |
|---|---|---|
| WO | WO 03/102456 A1 | 12/2003 |
| WO | WO 2011/133375 A1 | 10/2011 |

\* cited by examiner

COUPLING

CROSS-REFERENCE TO RELATED APPLICATIONS

This application claims priority under 35 U.S.C. §119(e) and the benefit of U.S. Provisional Application No. 61/636,895 entitled COUPLING, filed on Apr. 23, 2012, by Douglas A. Kieper, the entire disclosure of which is incorporated herein by reference.

BACKGROUND OF THE INVENTION

The present invention relates to a coupling and, particularly, one for coupling a water supply line to a water meter.

In recent years, in order to reduce exposure of individuals to lead in their water supply systems, federal and state government agencies have issued regulations that provide standards for acceptable levels of lead in drinking water and the amount of lead that can leech from plumbing fittings. In order to meet these specifications, several low lead alloys are being employed in plumbing fittings. Fittings made of low lead alloys, however, are somewhat expensive and costly to manufacture. Plastic fittings have become popular as an alternative to the higher priced copper and bronze plumbing fittings and tubing but, for some applications, they may not provide the desired strength and durability.

As a result, and particularly where fastening fittings, such as union joints and the like are involved, plastic fittings, such as coupling nuts have been reinforced either internally or externally with metal. U.S. Pat. No. 4,682,797 shows one approach to composite polymeric and metal pipe fittings. It would be desirable to provide a universal polymeric fitting which is sufficiently strong, such that it can be employed in plumbing systems which are substantially lead-free.

SUMMARY OF THE INVENTION

A plumbing fitting includes a polymeric tailpiece having a first end for coupling to a conduit and an opposite second end with a radially outwardly extending annular flange having an annular face surface. A circular recess is formed in said face surface for receiving a seal. A nut is positioned over the tailpiece and has a radially inwardly extending annular rim engaging a side of the annular flange opposite the face surface. The nut is formed of a polymeric material having internal threads and integrally includes a metal insert extending in concentric spaced relationship to the threads of the nut. The insert includes an end which is threaded and which is coaxial with the polymeric threads of the nut and located on the nut remote from the annular rim such that as the fitting is secured to a second plumbing fitting, the threads of the metal insert engage the second plumbing fitting first. The threads of the metal insert are axially dimensioned to allow the polymeric threads of the nut to engage the second plumbing fitting as the fitting is secured and the seal engages the second plumbing fitting to form a watertight connection with the metal insert not in communication with the flow path.

The resultant fitting provides a relatively low cost robust lead-free fitting suitable for a variety of applications in a plumbing system.

These and other features, objects and advantages of the present invention will become apparent upon reading the following description thereof together with reference to the accompanying drawings.

DETAILED DESCRIPTION OF THE PREFERRED EMBODIMENT

Figure 1:
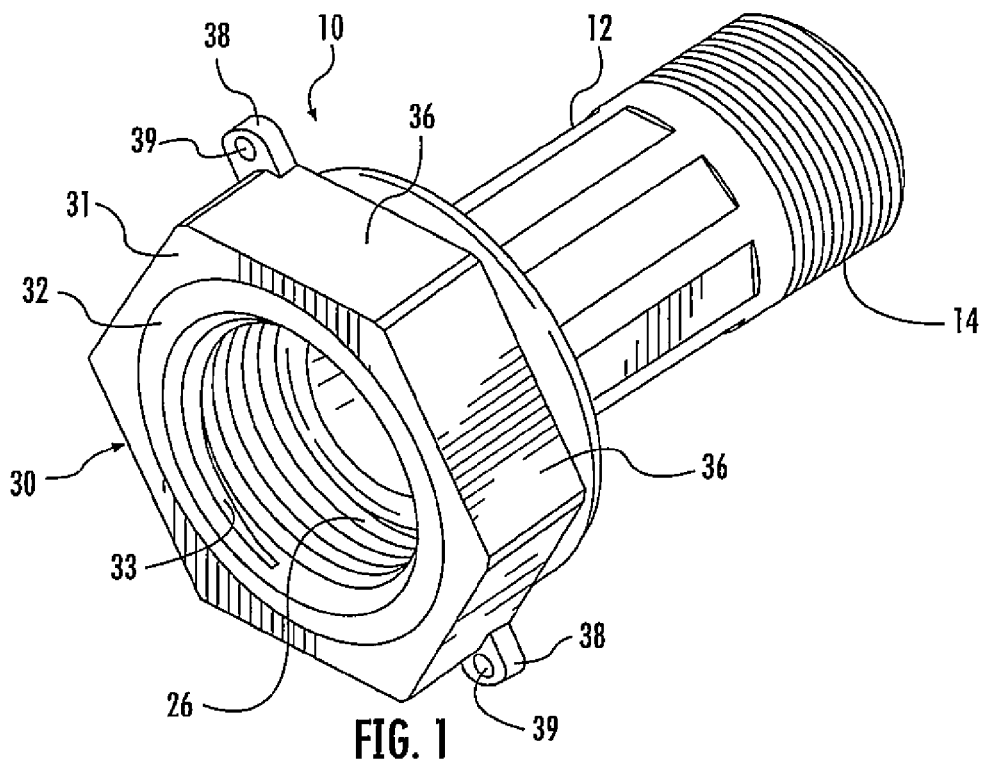
FIG. 1 is a perspective view of the plumbing fitting of the present invention.
Figure 2:
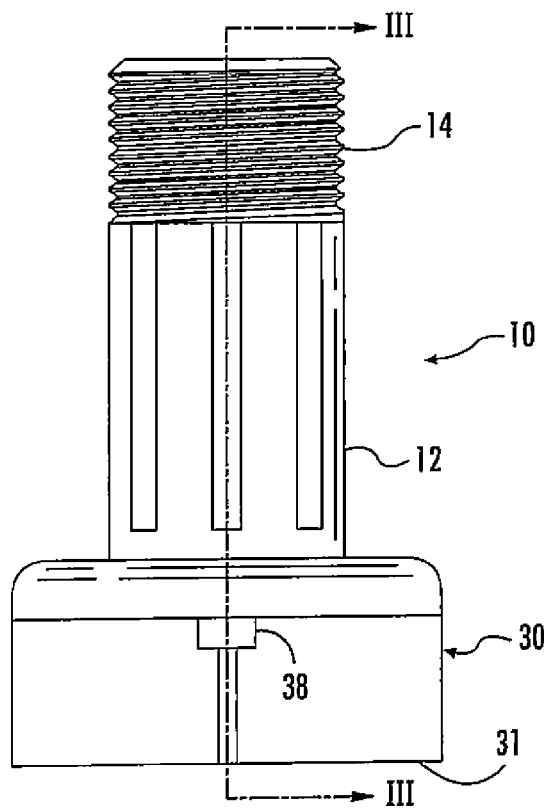
FIG. 2 is a side elevational view of the fitting shown in FIG. 1.
Figure 3:
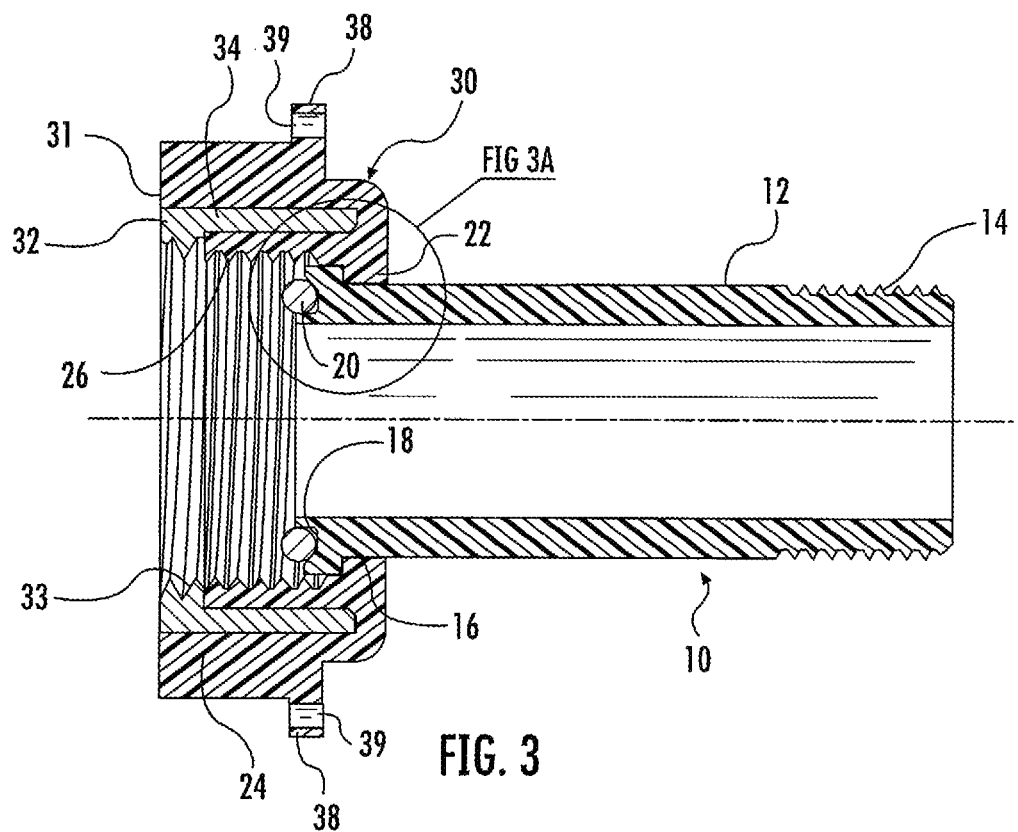
FIG. 3 is a cross-sectional view of the fitting taken along section line III-III of FIG. 2.
Figure 3A:
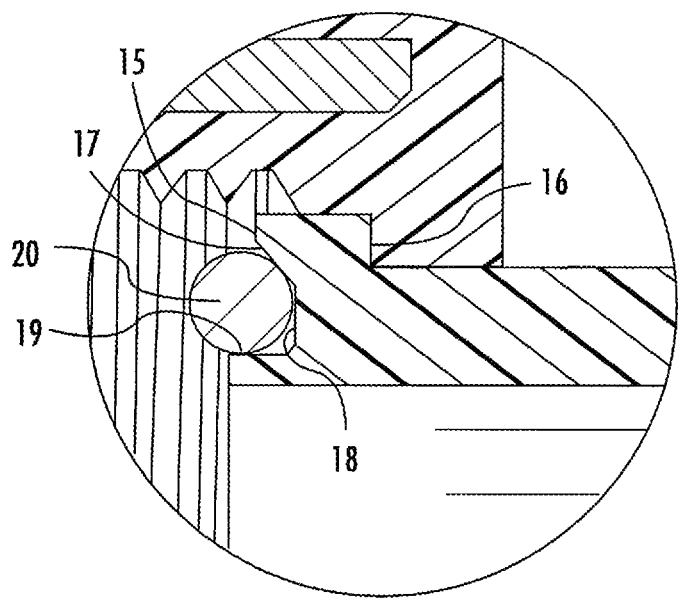
FIG. 3A is an enlarged view of the seal recess in the circled area of FIG. 3.
Figure 4:
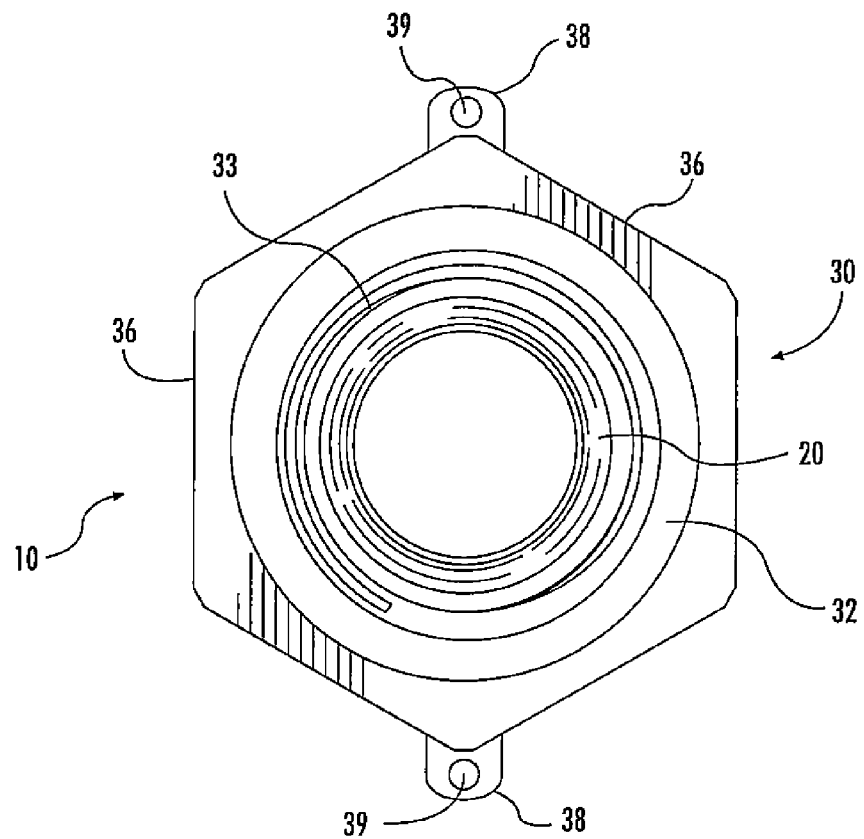
FIG. 4 is a left end elevational view of the fitting shown in FIG. 1.

A plumbing fitting, such as tailpiece assembly 10, embodying the present invention is shown in FIGS. 1-4. The tailpiece assembly comprises three sections, including a polymeric end piece 12, a metal reinforced polymeric nut 30, and an O-ring or other seal 20. The end piece 12 is threaded at a first end 14 to receive a standard threaded plastic fitting, such as union nut 52 (FIG. 5) for coupling to a water supply conduit 50. The opposite or second end of end piece 12 includes an annular radially outwardly extending flange 16 (FIG. 3). The annular face surface 15 (FIG. 3A) of the flange 16 includes a circular recess 18 for receiving an O-ring or other type of seal 20. Seal 20 is preferably an O-ring made of EPDM. The recess 18 has a chamfered outer edge 17 and a straight axially extending inner edge 19 (FIG. 3A). This geometry allows seal 20 to compress against a mating fitting to fitting 10 to form a watertight face seal.

The flange 16 is captively held by a radially inwardly extending annular rim 22 of a plastic and metal composite adapter nut 30. Nut 30 is molded of a polymeric material 24 with a generally cylindrical metal insert 32 that is insert-molded concentrically in spaced relationship to the polymeric threads 26 of nut 30, as best seen in FIG. 3. Insert 32 can be made of any suitable metal, such as aluminum, brass, bronze, stainless steel, copper, or other metal depending upon a given application. Insert 32 has a cylindrical section 34 positioned in radially spaced relationship to surround and reinforce the threaded section 26 of nut 30. Insert 32 includes a metal lead-in thread section 33, which is flush with the outer surface 31 of nut 30 and concentrically aligned with threads 26 of hex nut 30. The size and pitch of threads 33 are the same as the size and pitch of threads 26 of nut 30. As the fitting 10 is attached to a second plumbing fitting, the lead-in metal threads 33 are first to engage. This protects polymeric threads 26, particularly when the second plumbing fitting has metal mating threads. Nut 30 can have a standard hex configuration with six flats 36 for tightening the fitting 10 to a second plumbing fitting. The polymeric material for nut 30 and end piece 12 can be any suitable material typically employed in the plumbing industry, including PVC, CPVC, PVDF, PP, FKM, EPDM, PTFE, or CR, depending on the particular application and fluid being carried. The nut 30 has a pair of opposed tabs 38 with apertures 39 for receiving a wire seal when used in a water meter installation, as illustrated in FIG. 5.

Figure 5:
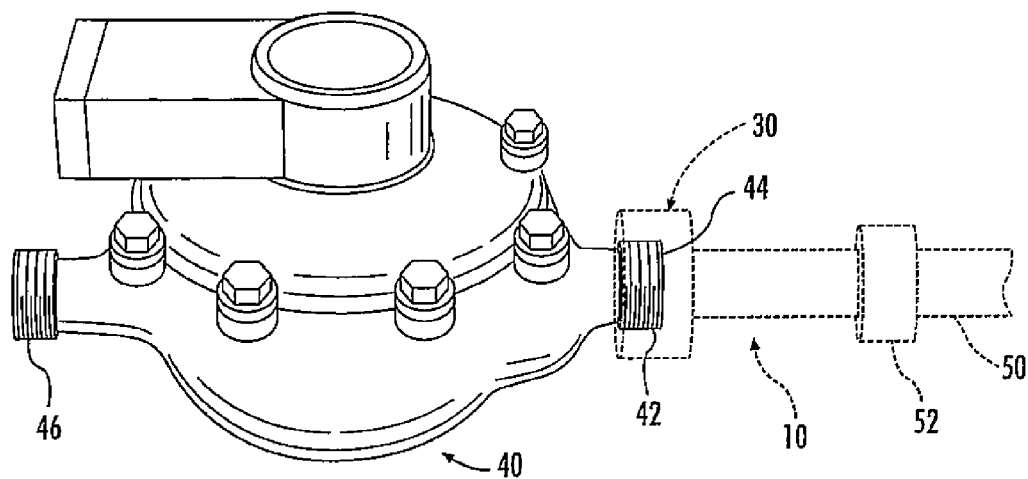
FIG. 5 is a perspective view of a typical water meter with the fitting of FIGS. 1-4 (shown in phantom form) used for coupling a water supply line to the meter.

In this application of fitting 10, it is adapted to couple a water supply conduit 50 to a water meter 40, as shown in FIG. 5, using union 52 threaded to threaded end 14 of tailpiece assembly 10. The benefit of fitting 10 is that it provides a robust fitting and prevents the contact of water with metal in a water supply system. Thus, once nut 30 is secured to the threaded end 42 of the water meter, the metal insert 32 is clear of the flow path of water, which will only contact the polymeric end piece 12. The O-ring 20 forms a face seal against the annular face end 44 of the threaded end 42 of the water meter 40. The use of a polymeric end piece 12 in combination with the O-ring 20 and the metal reinforced polymeric nut 30 provides strength for a secure connection to the water meter while eliminating contact of the water with any metal. A further similar fitting 10 can be coupled to the threaded outlet end 46 of meter 40 to couple to a water distribution conduit.

It will become apparent to those skilled in the art that various modifications to the preferred embodiment of the invention as described herein can be made without departing from the spirit or scope of the invention as defined by the appended claims.

The invention claimed is:

1. A two-piece plumbing fitting including a tailpiece and a separate nut comprising:
 a polymeric tailpiece having a first end and an opposite second end with a radially outwardly extending annular flange having an annular face surface;
 a circular recess formed in said face surface, said circular recess having an o-ring seal therein, wherein said recess has a chamfered outer edge and a straight axially extending inner edge; and
 a nut positioned over said tailpiece and having an inwardly extending annular rim engaging a side of said flange opposite said face surface, said nut made of a polymeric material having internal polymeric threads, said nut further including an integral metal insert which is cylindrical extending in concentric spaced relationship to said polymeric threads of said nut, said insert including a lead-in metal thread at the end of said nut and which is coaxial with said polymeric threads of said nut and is in axially spaced relationship to said circular recess and said polymeric threads, such that, when said tailpiece is coupled to a mating plumbing member, fluid flowing through said tailpiece does not contact said metal insert; wherein the annular face surface adjacent to the straight axially extending inner edge extends axially past the annular face surface adjacent to the chamfered outer edge, and wherein the nut includes a pair of tabs on an outer surface, with each tab having an aperture extending therethrough, wherein the aperture is configured to receive a wire seal.

2. The fitting as defined in claim 1 wherein said polymeric material for said tailpiece and said nut is one of PVC, CPVC, PVDF, PP, FKM, EPDM, PTFE, or CR.

3. The fitting as defined in claim 1 wherein said first end of said tailpiece is threaded.

4. The fitting as defined in claim 1 wherein said first end of said tailpiece is externally threaded.

5. The fitting as defined in claim 1 wherein said insert is made of aluminum.

6. A plumbing fitting for coupling a water supply line to a second plumbing fitting comprising:
 a polymeric tailpiece having a first end for coupling to a supply line and an opposite end with a radially outwardly extending annular flange having an annular face surface;
 a circular recess formed in said face surface, said circular recess having an o-ring seal therein; wherein said recess has a chamfered outer edge and a straight axially extending inner edge;
 a seal positioned in said circular recess; and
 a nut positioned over said tailpiece and having a radially inwardly extending annular rim engaging a side of said flange opposite said face surface, said nut made of a polymeric material having internal polymeric threads, said nut further including an integral metal insert which is cylindrical extending in concentric spaced relationship to said threads of said nut and including an end which has a metal lead-in thread and which is coaxial with said polymeric threads of said nut and located on said nut in axially spaced relationship from said rim such that as said fitting is secured to a second plumbing fitting, said metal lead-in threads of said metal insert engages said second plumbing fitting first, wherein said metal lead-in threads of said metal insert are axially dimensioned to allow said polymeric threads of said nut to engage a second plumbing fitting as the fitting is secured and said seal engages the second plumbing fitting to form a watertight connection with said metal lead-in threads of said metal insert not exposed to fluid flowing through said tailpiece; wherein the annular face surface adjacent to the straight axially extending inner edge extends axially past the annular face surface adjacent to the chamfered outer edge, and wherein the nut includes a pair of tabs on an outer surface, with each tab having an aperture extending therethrough, wherein the aperture is configured to receive a wire seal.

7. The fitting as defined in claim 6 wherein said polymeric material is one of PVC and CPVC.

8. The fitting as defined in claim 6 wherein said one end of said tailpiece is threaded to allow its threaded connection to a supply line.

9. The fitting as defined in claim 8 wherein said one end of said tailpiece is externally threaded.

10. The fitting as defined in claim 6 wherein said insert is made of aluminum.

11. A water meter and a plumbing fitting for coupling a water supply line to the water meter comprising:
 a water meter having a threaded water input end;
 a polymeric tailpiece having a first end for coupling to a supply line and an opposite end with a radially outwardly extending annular flange having an annular face surface;
 a circular recess formed in said face surface for, said circular recess having an o-ring seal therein; wherein said recess has a chamfered outer edge and a straight axially extending inner edge;
 and
 a nut positioned over said tailpiece and having a radially inwardly extending annular rim engaging a side of said flange opposite said face surface, said nut made of a polymeric material having internal threads, said nut further including an integral metal insert which is cylindrical extending in concentric spaced relationship to said threads of said nut, said insert including a metal lead-in thread at the end of said nut which is coaxial with said threads of said nut and located in said nut such that said metal lead-in thread of said insert is substantially flush with said nut, such that, as said fitting is secured to said water meter, said metal lead-in thread of said metal insert engages said threaded input end first, and wherein said metal lead-in thread of said metal insert is axially dimensioned to allow said polymeric threads of said nut to engage said threaded input end as the fitting is secured and said seal engages said water meter to form a watertight connection with said metal lead-in thread of said metal insert in spaced relationship to and not exposed to water flowing through said tailpiece; wherein the annular face surface adjacent to the straight axially extending inner edge extends axially past the annular face surface adjacent to the chamfered outer edge, and wherein the nut includes a pair of tabs on an outer surface, with each tab having an aperture extending therethrough, wherein the aperture is configured to receive a wire seal.

12. The fitting as defined in claim 11 wherein said polymeric material is one of PVC, CPVC, PVDF, PP, FKM, EPDM, PTFE, or CR.

13. The fitting as defined in claim 11 wherein said one end of said tailpiece is threaded to allow its threaded connection to a supply line.

14. The fitting as defined in claim 13 wherein said one end of said tailpiece is externally threaded.

* * * * *

UNITED STATES PATENT AND TRADEMARK OFFICE
CERTIFICATE OF CORRECTION

| | | |
|---|---|---|
| PATENT NO. | : 9,261,215 B2 | Page 1 of 1 |
| APPLICATION NO. | : 13/865402 | |
| DATED | : February 16, 2016 | |
| INVENTOR(S) | : Kieper | |

It is certified that error appears in the above-identified patent and that said Letters Patent is hereby corrected as shown below:

In the specification

Column 1, line 19, "leech" should be -- leach --;

In the claims

Column 3, claim 1, line 20, "o-ring" should be -- O-ring --;

Column 3, claim 6, line 59, "o-ring" should be -- O-ring --;

Column 4, claim 11, line 39, delete "for"; and

Column 4, claim 11, line 40, "o-ring" should be -- O-ring --.

Signed and Sealed this
Third Day of May, 2016

Michelle K. Lee
*Director of the United States Patent and Trademark Office*